United States Patent [19]

Kochis et al.

[11] Patent Number: 5,175,762
[45] Date of Patent: Dec. 29, 1992

[54] REMOTE PRINTING USING FAX

[75] Inventors: Richard L. Kochis; Brian L. Hastings, both of Fort Collins, Colo.

[73] Assignee: Hewlett-Packard Company, Palo Alto, Calif.

[21] Appl. No.: 865,794

[22] Filed: Apr. 7, 1992

Related U.S. Application Data

[63] Continuation of Ser. No. 606,244, Oct. 31, 1990, abandoned.

[51] Int. Cl.⁵ .......................................... H04M 11/00
[52] U.S. Cl. ..................................................... 379/100
[58] Field of Search .................. 358/434, 442; 379/93, 379/96-98, 100

[56] References Cited

U.S. PATENT DOCUMENTS

| | | | |
|---|---|---|---|
| 4,587,633 | 5/1986 | Wang et al. | 358/403 |
| 4,802,204 | 1/1989 | Chang | 379/100 |
| 4,827,349 | 5/1989 | Ogata et al. | 358/434 |
| 4,860,110 | 8/1989 | Kokubu | 358/434 |
| 4,907,094 | 3/1990 | Mishima et al. | 358/437 |

FOREIGN PATENT DOCUMENTS 0283295 9/1988 European Pat. Off. .............. 379/96

OTHER PUBLICATIONS

Introduction to the CCITT T.30 specification, M. Erickson, Feb. 16, 1990, Hewlett Packard Memo.
Adobe Demos Postscript Fax/Printer, Infoworld vol. 11, Issue 45, Nov. 6, 1989, p. 12 (Entire Article).
Appendix A and Appendix B Laserjet IIP Printer User's Manual, Hewlett Packard 1989.
Terminal Equipment and Protocols for Telematic Services, Recommendations T.0-T.63, The International Telegraph and Telephone Consultative Committee, IXth Plenary Assembly, Melbourne, Nov. 14-25, 1988, pp. 77-118.

Primary Examiner—James L. Dwyer
Assistant Examiner—Wing F. Chan

[57] ABSTRACT

Disclosed is a system having a Multi-Functional Peripheral Device with a FAX transmitting facility attached to a local computer, and a compatible FAX receiving facility, with an attached printer, accessible remotely from the computer. The local computer sends a command to the local FAX transmitting facility causing it to connect to the remote FAX receiving facility. The computer then sends data to the local FAX facility, which sends the data to the remote FAX facility where it is printed on the printer. Both FAX facilities use a FAX transmission protocol, CCITT Group 3, however, they use the Non-Standard Facility (NSF) within CCITT Group 3 to transfer the file without converting it into a graphical image format.

4 Claims, 6 Drawing Sheets

REMOTE PRINTING USING FAX

This is a continuation of copending application 07/606,244 filed on Oct. 31, 1990, now abandoned.

FIELD OF THE INVENTION

This invention relates to computer systems and more particularly to printing on such systems. Even more particularly, the invention relates to printing data on a remote printer using facsimile data transmission.

BACKGROUND OF THE INVENTION

In small or personal computer systems, modems or other data transmission capability is increasingly being built into or attached to the computer system. These systems sometimes have the ability to transfer files from one computer system to another, through a software program running in the computer system. Although these systems can transfer a file to a remote computer system, and the remote computer system can print the file transferred, this type of operation requires considerable expertise and intervention by the user of the system. For example, in order to print a file created by word processing software on a remote computer, the user of the word processing software must first format the file, using the word processing software, into a file that is compatible with a printer and then place the file on a disk. The user then unloads the word processing software, loads the file transfer software, telephones the remote computer system, and uses the file transfer software to transfer the printer compatible file to the remote computer system. The user must then telephone another user at the remote computer system and ask this second user to print the file that was transferred.

Some computer systems have facsimile transmission facilities, called FAX boards, built into them. These FAX boards can send a file from the computer system to a remote FAX machine, or another FAX board, where the file is printed. Significantly, however, these systems first convert the file being transmitted from the standard computer file format, such as ASCII, into a graphical image format and transmit the graphical image to the remote FAX system. Since graphical images are much larger than standard files, this method requires significantly more time to print a file remotely then would be required if the file were left in the standard format. Also, if the remote receiving FAX system is a FAX board in a computer, the file may be stored on the remote system, and a user of the remote system will still have to intervene to print the file before it is available.

There is a need in the art then for a system to print remotely without requiring user intervention. There is further need for such a system that uses facsimile transmission capability available on the local and remote computer systems. A still further need is for such a system that transmits the data in a standard computer file format, such as ASCII, rather than converting the data into a graphical image format. The present invention meets these needs.

SUMMARY OF THE INVENTION

It is an aspect of the present invention to allow remote printing of a file.

It is another aspect of the invention to provide such remote printing without requiring user intervention.

Another aspect of the invention is to provide remote printing while sharing the remote printer with a remote computer system.

A further aspect is to provide such remote printing using facsimile transmission facilities attached to the computer.

A further aspect of the invention is to provide remote printing using the Non-Standard Facility (NSF) of the CCITT Group 3 FAX transmission protocol.

A further aspect is to provide remote printing using CCITT Group 3 FAX without converting the file to a graphical image format.

A still further aspect is to provide remote printing capability having print quality superior to standard FAX printers.

The above and other objects of the invention are accomplished in a system having a FAX transmitting facility attached to a computer, and a compatible FAX receiving facility, with an attached printer, accessible remotely from the computer. The computer sends a command to the local FAX transmitting facility causing it to connect to the remote FAX receiving facility. The computer then sends the file to the local FAX facility, which sends the file to the remote FAX facility where it is printed on the printer.

Both FAX facilities use a FAX transmission protocol, CCITT Group 3, however, they use the Non-Standard Facility (NSF) within CCITT Group 3 to transfer the file without converting it into a graphical image format. Therefore, using the NSF, the file remains in the standard file format of the computer, which saves considerable transfer time. For example, a typical page of data in graphics format may take 30 to 45 seconds to transmit, whereas that same page, in standard computer file format, would take only 2 to 3 seconds to transmit.

The FAX facility in the preferred embodiment is a multi-functional peripheral device which has the ability to share the printer with the host computer system, along with FAX transmitting and receiving capability. When the host computer wishes to print remotely, it prefaces the print file with a setup command string giving the remote print command and the remote telephone number. The local multi-functional peripheral device calls the remote multi-functional peripheral device and transfers the file in the host computer file format. The remote multi-functional peripheral device receives the file and prints it on the remote printer.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
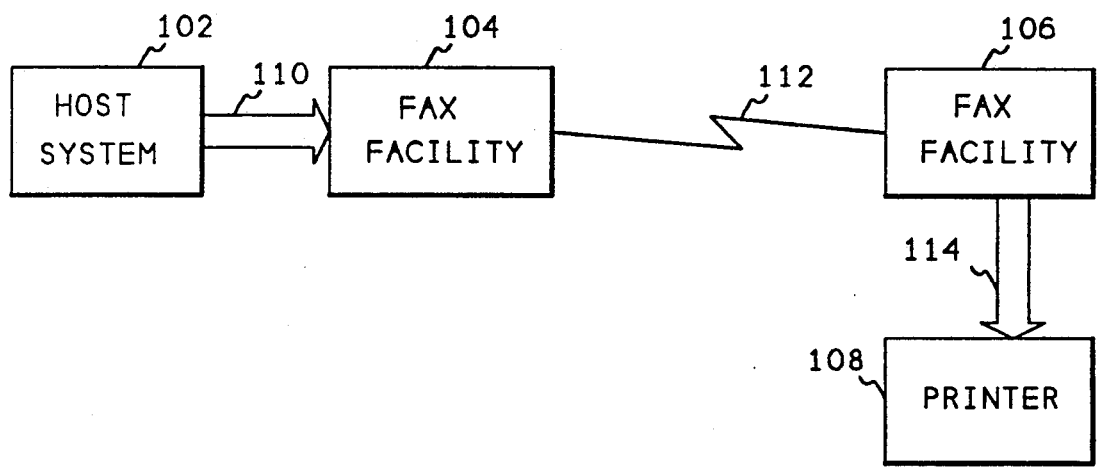
FIG. 1 shows a block diagram of the concepts of the system of the present invention.

FIG. 1 shows a block diagram depicting the concept of the present invention and its environment. Referring now to FIG. 1, a host system 102 is connected over a bus 110 to a FAX facility 104. The FAX facility 104 is connected via a telephone line 112 to a remote FAX facility 106 which is connected via bus 114 to a printer 108. The host system 102 sends data over the bus 110 to the local FAX facility 104. This data contains a command that causes the FAX facility 104 to connect, via the telephone line 112, to the remote FAX facility 106. After the connection has been made, any data sent by the host system 102 is transferred over the telephone line 112 to the remote FAX facility 106, which then sends the data to the printer 108 where the data is printed. Each time data is received by the local FAX facility 104, it sets a timer. If the timer expires, the local FAX facility 104 assumes that the host system 102 has completed printing and disconnects from the remote FAX facility 106.

Figure 2:
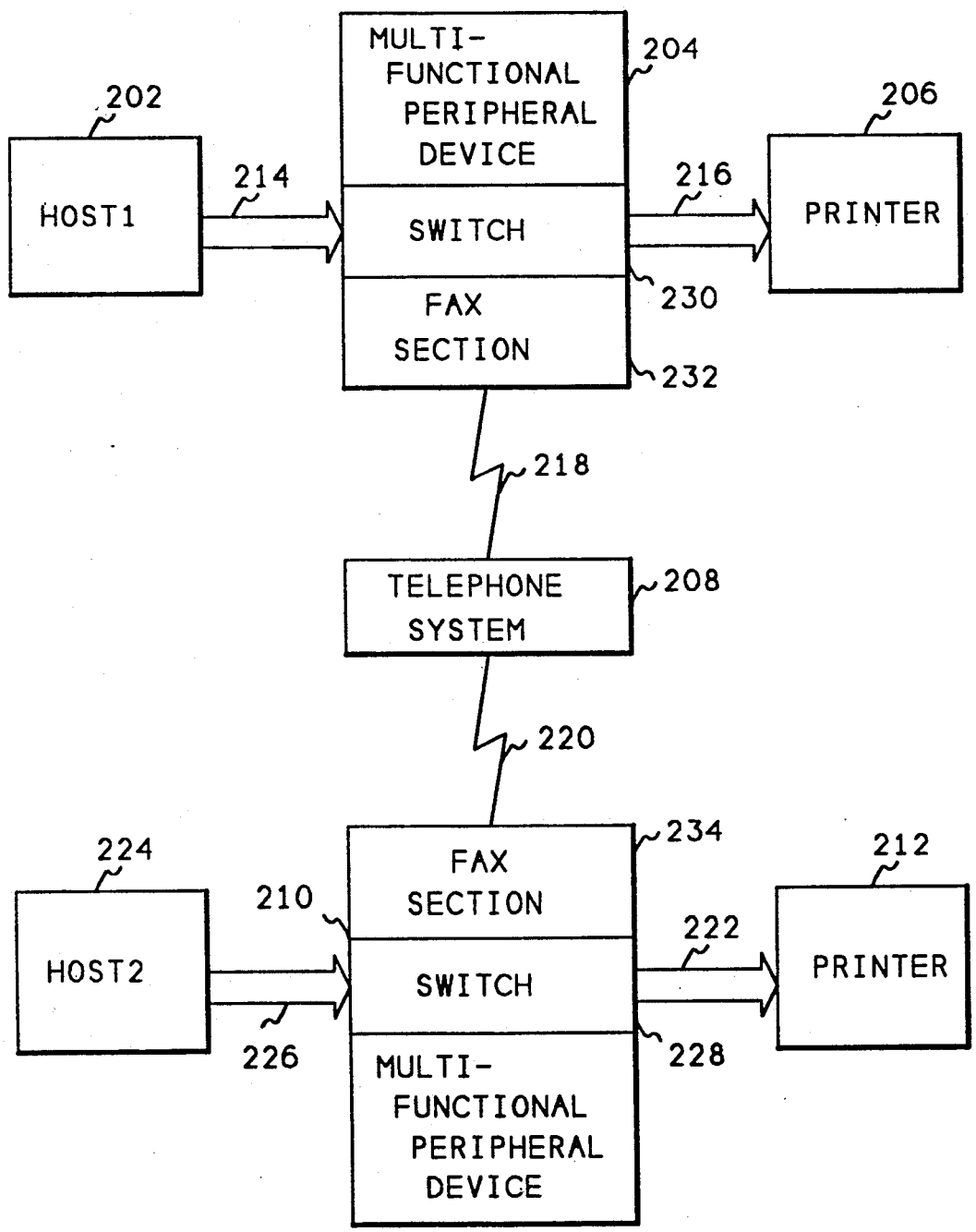
FIG. 2 shows a block diagram of the system of the present invention being used to print data on a remote printer by using a FAX section of a Multi-Function Peripheral Device.

FIG. 2 shows a block diagram wherein the present invention uses a pair of Multi-Functional Peripheral Devices to print remotely. Referring now to FIG. 2, a host system 202 is connected via a bus 214 to a local Multi-Functional Peripheral Device 204 which contains a switch 230 and a FAX section 232. A remote Multi-Functional Peripheral Device 210 is connected via wires 220 to a telephone system 208. The telephone system 208 is connected via wires 218 to the FAX section 232 of the local Multi-Functional Peripheral Device 204. The switch 230 is also connected via a bus 216 to a local printer 206. The switch 232 allows the host system 202 to share the printer 206 with the FAX section 232. A remote FAX section 234, within the remote Multi-Functional Peripheral Device 210 performs the same function as the local FAX section 232. The FAX section 232 calls the FAX section 234 when the host system 202 sends a remote print command over the bus 214. When the remote FAX section 234 receives a call from the local FAX section 232, it connects to the remote printer 212 and reconfigures the printer 212 to allow it to receive data from the host 202. When the host system 202 sends printer data to the Multi-Functional Peripheral Device 204, the data is routed to the FAX section 232 which sends it to the remote FAX section 234. The remote FAX section 234 then sends the data to the printer 212 where it is printed.

A switch 228 within the remote Multi-Functional Peripheral Device 210 monitors all commands sent from a remote host system 224 to the remote printer 212 in order to keep a copy of the printer state within RAM contained in the device 210. Therefore, after the remote print is complete, the switch 228 uses its copy of the printer 212 state to place the printer 212 back into the state expected by the host system 224. In the same manner, host2 224 can print data on printer 206.

Figure 3:
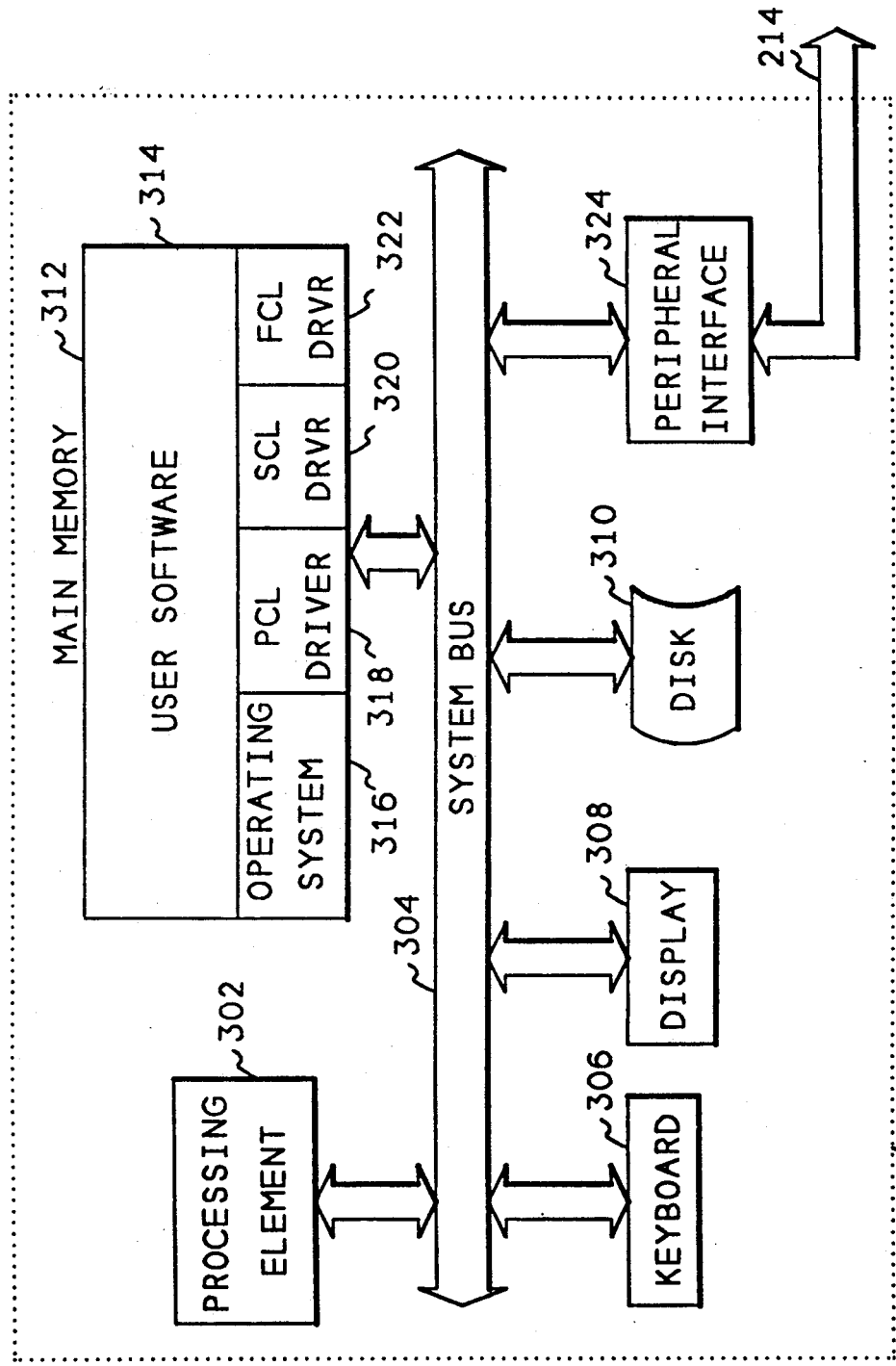
FIG. 3 shows a block diagram of the host computer system of FIG. 2.

FIG. 3 shows a block diagram of the host computer system 202 of FIG. 2, which is typical of host computer systems. The only requirement of a host system is that it have a parallel or serial interface to a printer. Referring now to FIG. 3, the host system 202 contains a processor 302 which is connected to the other components of the system over a system bus 304. A keyboard 306 allows a user of the host system 202 to enter information into the system. A display 308 allows information to be presented to the user of the host system 202. A disk 310 is used to store software and data for the host system 202 and a peripheral interface 324 is used to communicate over a bus 214 to the Multi-Functional Peripheral Device 204 containing the switch of the present invention. The peripheral interface 324 may be a serial interface such as RS/232, or a parallel interface such as the Centronics parallel printer interface.

A memory 312 contains user software 314 and an operating system 316. Printer Command Language (PCL) driver software 318 is used by the user software 314 to communicate to the printer 206 through the switch 230 of the present invention. A Scanner Command Language (SCL) driver module 320 is used to communicate to a scanner device within the Multi-Functional Peripheral Device 204. A FAX Command Language (FCL) driver module 322 is used by the user software 314 to control all FAX functions within the Multi-Functional Peripheral Device 204.

Figure 4:
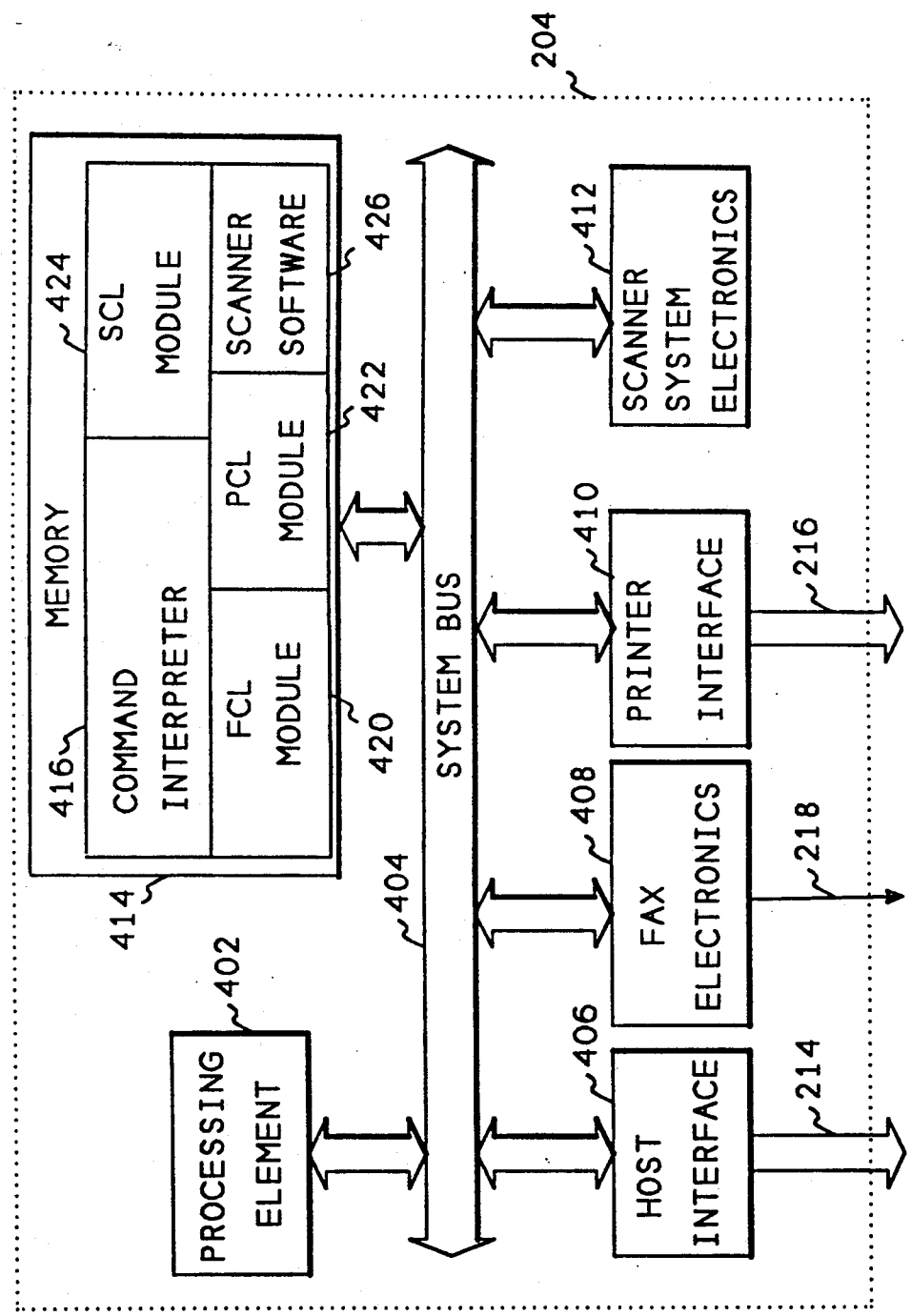
FIG. 4 shows a block diagram of the Multi-Functional Peripheral Device of FIG. 2, which includes the present invention.

FIG. 4 shows a block diagram of the Multi-Functional Peripheral Device 204, which contains the system of the present invention. Referring now to FIG. 4, the Multi-Functional Peripheral Device 204 contains a processor 402 which communicates to other elements of the system over a system bus 404. A host system interface 406 is used to communicate with the host system 202 over the bus 214. FAX electronics 408 are used to communicate to the remote FAX section 234 (FIG. 2) via the telephone system 208 (FIG. 2) over the bus 218. A printer interface 410 is used to send data to the printer 206 over the bus 216. Scanner system electronics 412 are used with a data scanning device which may also be part of the Multi-Functional Peripheral Device 204. A memory 414 contains a command interpreter 416 which routes PCL, FCL, and SCL commands between the PCL (318), FCL (322), and SCL (320) drivers in FIG. 3 and the PCL (422), FCL (420), and SCL (424) modules of FIG. 4. The PCL, FCL, and SCL modules within the Multi-Functional Peripheral Device 204 control the printer interface 410, the FAX electronics 408 and the scanner system electronics 412, respectively. The command interpreter 416 will be described below with respect to FIGS. 5 and 6. An FCL module 420 is used to process commands sent by the FCL driver module 322 (FIG. 3) in order to perform FAX related functions, including receiving and printing remote data and FAX messages on the shared printer 206. The FCL module 420 sends commands and status to the command interpreter 416 which processes those commands and sends them to the host system 202. The FCL module 420, when receiving remote print data or a FAX, also sends data directly to a PCL module 422. The PCL module 422 receives commands and data from the command interpreter and the FCL module 420, and passes those commands through the printer interface 410 to the printer 206 (FIG. 2). An SCL module 424 receives scanner command language commands from the SCL driver module 320 (FIG. 3) and passes those commands to scanner system software 426 which interfaces to the scanner system electronics 412.

Figure 5:
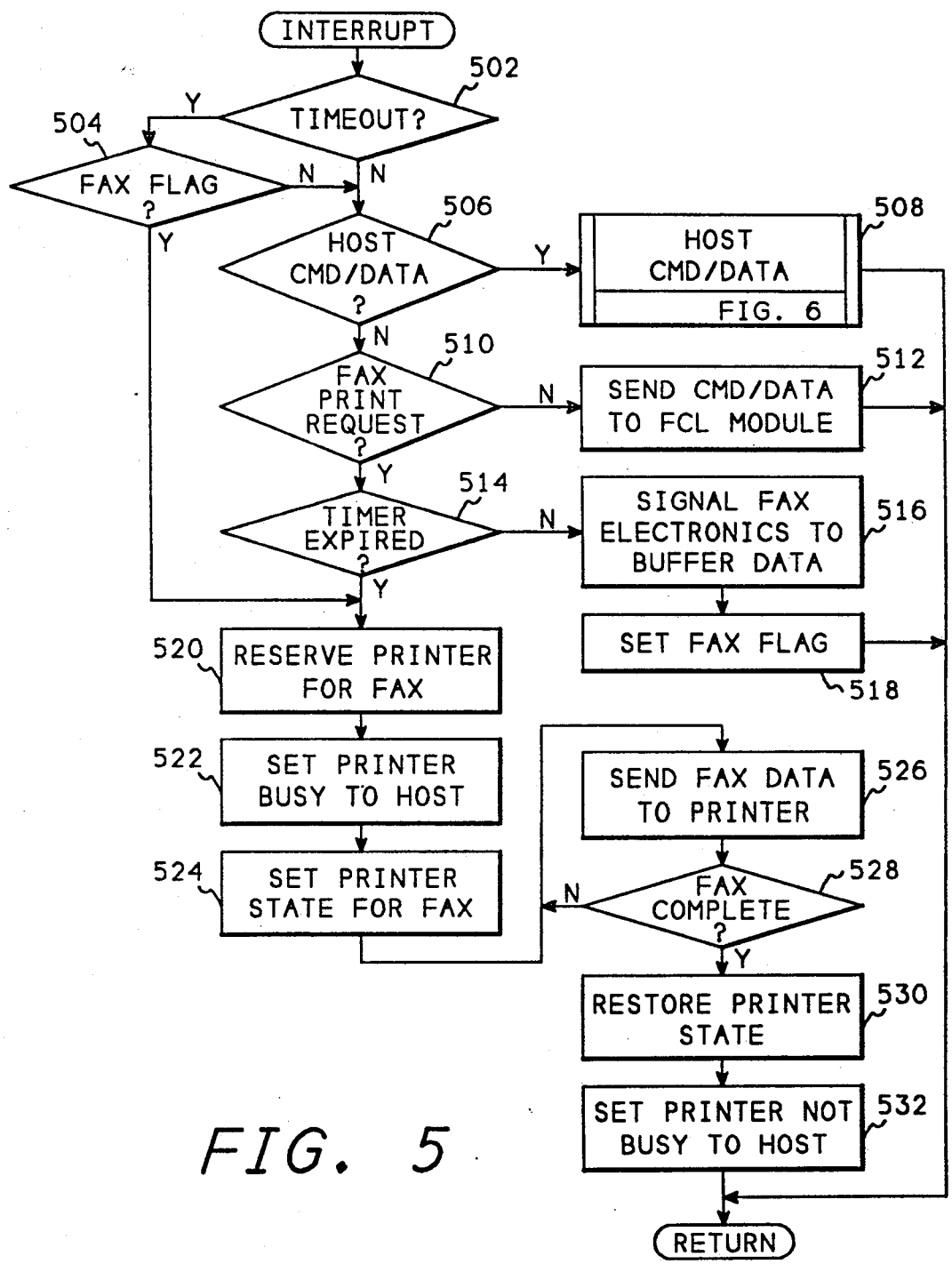
FIG. 5 shows a flowchart of the top level of the software of the present invention.
Figure 6:
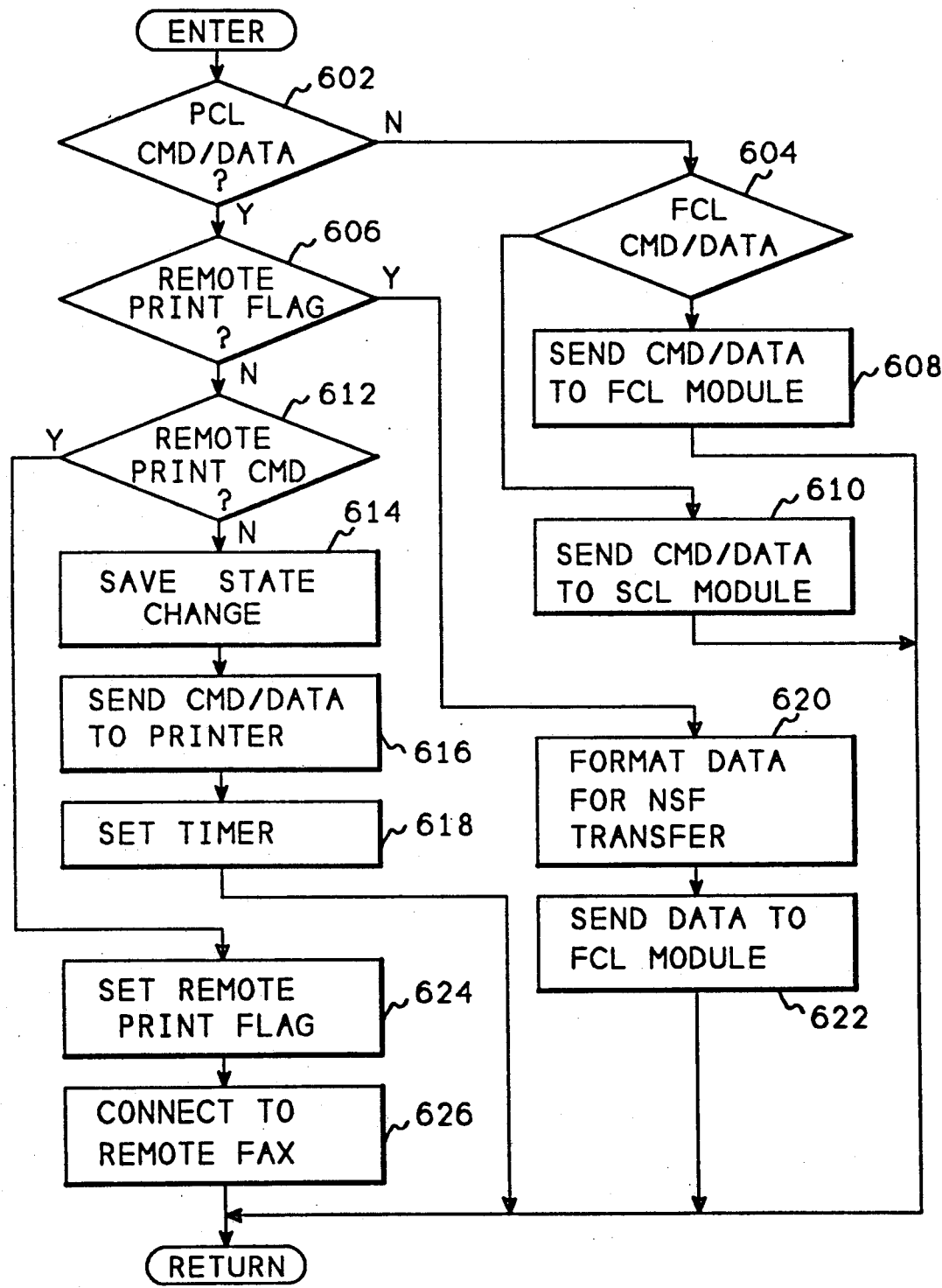
FIG. 6 shows a flowchart of the host data/command processing software of the present invention.

FIGS. 5 and 6 show flowcharts of the software of the command interpreter 416 of FIG. 4. This software is used to perform the remote printing and switch functions of the present invention, in conjunction with hardware described by the block diagram of FIG. 4. Referring now to FIGS. 5 and 6, this flowchart is entered when an interrupt occurs. The interrupt indicates that a command or data has arrived from either the host system or the FAX section of the Multi-Functional Peripheral Device. After entry, block 502 determines whether a timeout has occurred. A timeout will occur when the host system has completed using the printer. If a timeout has occurred, block 502 transfers to block 504 which determines if the FAX is waiting to print. If the FAX is waiting to print, block 504 transfers control to block 520 to start the FAX print, otherwise, block 504 transfers to block 506. Block 506 determines whether data or commands have been received from the host over the host interface 406. If data or a command has been received from the host, block 506 transfers to block 508 which calls FIG. 6 to process the data or command from the host before returning from the interrupt.

If a command or data has not been received from the host, block 506 transfers to block 510 which determines whether a print request has been received from the FAX section of the Multi-Functional Peripheral Device. If a FAX print request has not been received, then a command or data has been received from the FAX section, so block 510 transfers to block 512 to send the command or data to the FCL module for processing. If a FAX print request has been received from the FAX section, block 510 transfers to block 514 which determines if time has expired on the timer. If time has not expired, the host is still printing, so block 514 transfers to block 516 which signals the FAX electronics 408 to buffer the incoming FAX data. Then block 518 sets the FAX flag to indicate that the FAX is waiting to print.

If the timer has expired, block 514 transfers to block 520 which reserves the printer for the FAX, and block 522 sets a busy signal in interface 214 to indicate to the host that the printer is busy. Block 524 sends commands to the printer to set the printer state to allow a FAX print, and block 526 sends the first FAX data to the printer. Block 528 determines if all FAX data has been sent, and if not, block 528 transfers back to block 526 to send more data. After all FAX data has been sent, block 528 transfers to block 530 which sends commands to the printer to restore the printer state, and then block 532 removes the busy signal from interface 214 before returning from the interrupt.

FIG. 6 shows a flowchart of the host data command processing module called by block 508 (FIG. 5). Referring now to FIG. 6, after entry, block 602 determines whether printer command language commands or data were received. If not, block 602 transfers to block 604 which determines whether FAX command language commands or data were received. If FAX command language commands or data were received from the host, block 604 transfers to block 608 which sends the command or data to the FCL module for processing.

If FCL command/data information was not received, the system assumes that the command/data is for the SCL module, and control goes to block 610 to send the command or data to the SCL module for processing.

If PCL commands or data were received, block 602 transfers to block 606 which determines whether the remote print flag is set. If the remote print flag is set, block 606 transfers to block 620 which formats the data for transmission to the remote FAX unit, and block 622 sends the data to the FCL module for transmission to the remote FAX unit where it will be printed. Control then returns to FIG. 5.

If the remote print flag is not set, control goes to block 612 which examines the PCL command/data to determine if a remote print command has been received. Table 1 shows an example of a remote print command, which is an escape sequence sent before the data is sent. In Table 1, 9999999999 represents the telephone number of the remote printer. If a remote print command has been received, block 612 transfers to block 624 which sets the remote print flag, and block 626 uses the telephone number in the remote print command to dial the remote FAX and establish communication for the remote print. After establishing communication with the remote FAX, block 626 then returns to FIG. 5 to wait for data to be sent.

If the command or data received from the host was not a remote print command, it is assumed that the command or data is to be sent to the local printer, so block 612 transfer to block 614 which saves any change in the printer state in a buffer. Block 616 then sends the commands or data to the PCL module for processing, and block 618 sets a timer indicating that the host is using the printer. This timer is always set to a new value when new commands or data are received for the printer. Therefore, after the host has completed using the printer, the timer will time for a full five to ten seconds before the FAX will be allowed to use the printer. This provides sufficient time for the host to re-address the printer if more printing is to be done.

After setting the timer value, or after sending commands or data to the FCL or SCL modules, FIG. 6 returns to FIG. 5.

Facsimile communication using CCITT Group 3 protocol consists of five separate and consecutive phases, as described in *CCITT Terminal Equipment and Protocols for Telematic Services, Volume VII—Fascicle VII.3, Recommendation T.30, IXth Plenary Assembly, Melbourne, 14–25 November* 1988, *published in Geneva,* 1989: phase A includes call set-up, dialing, answering, and establishing a connection; phase B includes pre-message procedure for identifying and selecting features such as fine mode, non-standard features (NSF), etc.; phase C includes data transmission; phase D includes post-message procedures including end-of-page, page confirmation, and multi-document messages; and phase E includes call release (hang up). In the present invention, phases A and B will follow the normal FAX protocol. The NSF command exchange in phase B will establish the use of the NSF for remote printing. A code in the NSF field will indicate that the receiver is capable of remote printing, and the sender will send a CCITT NSS command indicating that remote printing will be performed.

Phase C will then send the data in the computer standard format, typically ASCII, and the receiver will print the data on its attached printer thus providing faster transmission and higher print quality. This data will comprise:

---

1) The number of packets to be sent

-continued

| 2) | Number of bytes per packet |
| 3) | Packet one, followed by a 2-byte checksum |
| 4) | Packet two, followed by a 2-byte checksum |
| . | |
| . | |
| n) | Last packet, followed by a 2-byte checksum. |

Phase D is entered automatically when the proper number of packets have been sent and received. Phase D will be performed the same as for other normal FAX transmissions, and phase E will hang up in the same manner as other FAX transmissions.

The state information for a printer includes print resolution, such as 300 dots per inch; page orientation, such as portrait or landscape; paper margins; selected fonts; and page size. Other parameters may also be included in the printer state depending upon the type of printer being used. Different state information might be needed for other peripheral devices. For example, a disk would have selected read/write head and current cylinder as state information.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1—Remote Print Command

Esc*{4I99999999999I<cr>/* Enter remote Printing Mode */

What is claimed is:

1. A remote printing system for printing an electronic file hat is transmitted through a telephone communication system, said electronic file comprising printer commands, control codes, printable character codes, and graphical codes, said remote printing system comprising:

electronic source means for transmitting a remote printer command and said electronic file;

first facsimile means, connected to said electronic source means and connected to said telephone communication system;

for receiving and transmitting facsimile images via said telephone communication system, and for receiving and detecting said remote printer command from said electronic source means, and for receiving said electronic file from said electronic source means, and for transmitting said remote printer command and said electronic file as said printer commands, control codes, printable character codes and graphical codes via said telephone communication system, whenever said first facsimile means detects said remote printer command;

remote printer means for receiving said electronic file and for translating said printer commands, control codes, printable character codes and graphical codes into a printed document; and, second facsimile means, compatible with said first facsimile means, connected to said telephone communication system and connected directly to said remote printer means without an intervening computer, for receiving and transmitting facsimile data via said telephone communication system, and for receiving and detecting said remote printer command from said first facsimile means, and for receiving said electronic file from said first facsimile means, and for transmitting said electronic file directly to said remote printer means, without an intervening computer, as said printer commands, control codes, printable character codes and graphical codes, whenever said second facsimile means detects said remote printer command, so that said remote printer means prints a document in accordance with said electronic file.

2. A system as in claim 1 further comprising:

means for saving and restoring a printer state whenever said second facsimile means detects said remote printer command.

3. A method for remotely printing an electronic file from an electronic source, said electronic file comprising printer commands, control codes, printable character codes, and graphical codes, the method comprising the steps of:

transmitting a remote printer command and said electronic file from said electronic source to a first facsimile system, said first facsimile system capable of receiving and sending facsimile data;

detecting said remote printer command by said first facsimile system;

transmitting via a telephone communication system said remote printer command and said electronic file as said printer commands, control codes ,printable character codes, and graphical codes from said first facsimile system to a second facsimile system, said second facsimile system capable of receiving and sending facsimile data;

receiving via said telephone communication system said remote printer command from said electronic source by said second facsimile system;

detecting said remote printer command from said electronic source by said second facsimile system;

receiving via said telephone communication system said electronic file from said electronic source by said second facsimile system;

transmitting said electronic file as said printer commands, control codes, printable character codes and graphical codes from said second facsimile system directly to a printer, without an intervening computer, whenever said second facsimile system detects said remote printer command;

receiving said electronic file by said printer; and, translating said printer commands, control codes, printable character codes and graphical codes by said printer into a printed document.

4. A method as in claim 3 further comprising:

saving a printer state whenever said second facsimile means detects said remote printer command; and restoring said printer state whenever said printer completes printing said printed document.

* * * * *